United States Patent
Yilmaz et al.

(10) Patent No.: US 10,327,168 B2
(45) Date of Patent: Jun. 18, 2019

(54) RADIO NETWORK NODES, WIRELESS DEVICE, AND METHODS PERFORMED THEREIN FOR COMMUNICATING IN A WIRELESS COMMUNICATION NETWORK

(71) Applicant: Telefonaktiebolaget LM Ericsson (publ), Stockholm (SE)

(72) Inventors: Osman Nuri Can Yilmaz, Espoo (FI); Icaro L. J. da Silva, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 88 days.

(21) Appl. No.: 15/505,648

(22) PCT Filed: Jan. 2, 2017

(86) PCT No.: PCT/SE2017/050001
§ 371 (c)(1),
(2) Date: Feb. 22, 2017

(65) Prior Publication Data
US 2018/0220317 A1    Aug. 2, 2018

(51) Int. Cl.
*H04B 7/06* (2006.01)
*H04L 5/00* (2006.01)
(Continued)

(52) U.S. Cl.
CPC .......... *H04W 24/10* (2013.01); *H04B 7/0617* (2013.01); *H04L 5/006* (2013.01);
(Continued)

(58) Field of Classification Search
CPC ........ H04B 7/02–12; H04B 7/24–2696; H04B 17/0082–3913; H04J 11/005–0093; H04J 2011/0096; H04L 5/0001–26; H04W 16/02–32; H04W 24/02–10; H04W 28/16–26; H04W 28/0247–0268;
(Continued)

(56) References Cited

U.S. PATENT DOCUMENTS

| | | | | |
|---|---|---|---|---|
| 2013/0260741 A1* | 10/2013 | Yamada | ................ | H04W 24/10 455/422.1 |
| 2016/0219475 A1* | 7/2016 | Kim | ...................... | H04W 76/19 455/444 |
| 2017/0223690 A1* | 8/2017 | Zeng | .................. | H04W 72/046 370/330 |

FOREIGN PATENT DOCUMENTS

WO    WO 2016/061737 A1 *    4/2016    .......... H04W 72/046

OTHER PUBLICATIONS

3GPP, "3rd Generation Partnership Project; Technical Specification Group Radio Access Network; Study on Scenarios and Requirements for Next Generation Access Technologies; (Release 14)", 3GPP TR 38.913 V0.3.0 (Mar. 2016), Mar. 2016, 1-30.

(Continued)

*Primary Examiner* — Timothy J Weidner
(74) *Attorney, Agent, or Firm* — Murphy, Bilak & Homiller, PLLC

(57) ABSTRACT

Embodiments herein relate to a method performed by a wireless device for handling communication in a wireless communication network. The wireless device obtains an indication of one or more sets of reference signals, wherein each set is associated with one or more services. The wireless device further determines a service to use; and measures a signal strength or a quality of a reference signal of a set out of the one or more sets of reference signals, which set of reference signals is associated with the determined service.

20 Claims, 12 Drawing Sheets

(51) Int. Cl.
*H04W 24/08* (2009.01)
*H04W 24/10* (2009.01)
*H04W 28/02* (2009.01)
*H04W 72/04* (2009.01)
*H04W 72/08* (2009.01)

(52) U.S. Cl.
CPC .......... *H04L 5/0051* (2013.01); *H04L 5/0053* (2013.01); *H04W 24/08* (2013.01); *H04W 28/0268* (2013.01); *H04W 72/042* (2013.01); *H04B 7/063* (2013.01); *H04B 7/0632* (2013.01); *H04L 5/0091* (2013.01); *H04W 72/046* (2013.01); *H04W 72/085* (2013.01)

(58) Field of Classification Search
CPC ....... H04W 36/0055–0094; H04W 36/04–385; H04W 48/08–20; H04W 72/005–14; H04W 74/002–0891; H04W 76/10–38; H04W 88/06; H04W 88/10; H04W 88/12; H04W 92/04; H04W 92/10–24
See application file for complete search history.

(56) References Cited

OTHER PUBLICATIONS

3GPP, "3rd Generation Partnership Project; Technical Specification Group Services and System Aspects; Study on Architecture for Next Generation System (Release 14)", 3GPP TR 23.799 V0.5.0 (May 2016), May 2016, 1-178.
Unknown Author, "Active Mode Mobility in NR: SINR drops in higher frequencies", 3GPP TSG-RAN WG2 #93bis Tdoc R2-162762 Dubrovnik, Croatia, Source: Ericsson, Apr. 11-15, 2016, 1-4.
Unknown Author, "New SID Proposal: Study on New Radio Access Technology", 3GPP TSG RAN Meeting #71 RP-160671 Göteborg, Sweden, Source: NTT Docomo, Mar. 7-10, 2016, 1-8.

* cited by examiner

RADIO NETWORK NODES, WIRELESS DEVICE, AND METHODS PERFORMED THEREIN FOR COMMUNICATING IN A WIRELESS COMMUNICATION NETWORK

TECHNICAL FIELD

Embodiments herein relate to radio network nodes, a wireless device, and methods performed therein regarding wireless communication. Furthermore, a computer program and a computer-readable storage medium are also provided herein. In particular, embodiments herein relate to communicating in a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some networks may also be called, for example, a "NodeB" or "eNodeB". The service area or cell area is a geographical area where radio coverage is provided by the access node. The access node operates on radio frequencies to communicate over an air interface with the wireless devices within range of the access node. The access node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Overall requirements for the Next Generation (NG) architecture e.g. TR 23.799 v.0.5.0, and, more specifically the NG Access Technology, e.g. TR 38.913 v.0.3.0 will impact the design of the Active Mode Mobility solutions for the New Radio Access Technology (NR), see RP-160671 New SID Proposal: Study on New Radio Access Technology, DoCoMo, compared to the current mobility solution in LTE. Some of these requirements are the need to support network energy efficiency mechanisms, future-proof-ness and the need to support a very wide range of frequencies e.g. up to 100 GHz.

One of the main differences, with respect to LTE, comes from the fact that propagation in frequencies above the ones allocated to LTE is more challenging so that the massive usage of beamforming becomes an essential component of NR. Despite the link budget gains provided by beamforming solutions, reliability of a system purely relying on beamforming and operating in higher frequencies might be challenging, since the coverage might be more sensitive to both time and space variations. As a consequence of that a Signal to Interference plus Noise Ratio (SINR) of a narrow link can drop much quicker than in the case of LTE, see R2-162762, Active Mode Mobility in NR: SINR drops in higher frequencies, Ericsson.

To support Transmit (Tx)-side beamforming at a radio network node, a number of reference signals may be transmitted from the radio network node, whereby the wireless device can measure signal strength or quality of these reference signals and report the measurement results to the radio network node. The radio network node may then use these measurements to decide which beam(s) to use for the one or more wireless devices.

A combination of periodic and scheduled reference signals may be used for this purpose.

The periodic reference signals, typically called beam reference signals (BRS) or Mobility Reference Signals (MRS), are transmitted repeatedly, in time, in a large number of different directions using as many Tx-beams as deemed necessary to cover a service area of the radio network node. These reference signals may be scheduled or on a need-basis e.g., based on the traffic. As the naming indicates, each BRS represents a unique Tx-beam from that radio network node. This allows a wireless device to measure the BRS when transmitted in different beams, without any special arrangement for that wireless device from the radio network node perspective. The wireless device reports e.g. the received powers for different BRSs, or equivalently different Tx-beams, back to the radio network node.

The scheduled reference signals, called channel-state information reference signals (CSI-RS), are transmitted only when needed for a particular connection. The decision when and how to transmit the CSI-RS is made by the radio network node and the decision is signalled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a NR network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

Beamforming introduces a possibility to enhance the signal towards a specific location. This enables better signal to noise ratio towards a specific wireless device.

A specific beamforming towards a specific wireless device is handled per Transmission Time Interval (TTI) where a number of factors and measurements are used to determine how the beamforming should look like. With an increasing number of antenna elements, the number of possible beams that theoretically can be created increases a lot.

Consider a wireless communication system, consisting of radio network nodes also referred to as transmission points (TPs), and wireless devices. The radio network nodes employ beamforming, that is, the radio network nodes transmit their power in a prominent direction to increase the received power at the wireless devices. The radio network node may use beams from a finite set of pre-defined beams. It should also be understood the radio network node can use several of the beams at a same time. The radio network node periodically sends reference signals, such as the BRS or MRS, on each of the possible beams.

The wireless device measures the reference signal received power (RSRP) for each of the reference signals e.g. beam reference signal received power (BRSRP). The wireless device then reports the RSRP values back to the radio network node, which may perform a mobility process such as a handover based on the reported RSRP values.

The Reference Signals (RS) that can be used to support Radio Resource Control (RRC) driven mobility:
  For wireless devices in connected active mode non-wireless device specific RS for measurements may be used (the wireless device may not need to be aware whether the RS is wireless device-specific or non-wireless device specific)
  The non-wireless device specific RS can be found by the wireless device without much configuration
  The non-wireless device specific RS encodes an identity
  For wireless devices in connected mode, intra-cell mobility may be handled by mobility without RRC involvement and there may be cases that do require RRC involvement.

The radio interface of the existing wireless communication systems has been devised to support certain major services with different level of Quality of Service (QoS) requirements. Examples of such major services are voice characterized by low data rate, video streaming characterized by low delay and consistently moderate data rate etc. However, the future 5G wireless communication system will increase the data rate manifold with respect to the existing technology as well as enable lower latencies. This in turn will also pave the way for introducing a wide range of new services and applications in addition to supporting the existing ones. The characteristics of the future services may be very different for example in terms of their desired QoS targets, such as data rate, latency and reliability. Examples of such services are ultra-reliable and low-latency communication (URLLC) such as Vehicle to anything (V2X) and factory automation, ultra-high QoS consumer services (e.g., ultra-high quality audio and/or video conference call), applications requiring high precision (e.g., public safety related applications, medical application etc.), industrial applications characterized by very high reliability (e.g., factory automation, autonomous mining, aviation/drone related applications etc.), remote control applications etc.

Assuming LTE as baseline Radio Resource Management (RRM) measurements supporting RRC based mobility are based on a single reference signal per cell, so-called cell-specific RS (CRS). These reference signals are transmitted all the time i.e. in every LTE subframe of a given cell and across the whole system bandwidth. However, in 5G or New Radio Access Technology (NR), some differences are envisioned for the signals used for RRM measurements to support e.g. RRC based mobility. With the usage of beamforming, there may be multiple reference signals defined per cell, so called Mobility Reference Signals (MRSs) and/or beam-specific reference signals (BRSs), each of them carrying at least a beam ID or similar.

These beams, each assigned with at least one MRS/BRS to support RRM measurements in NR, could be of different characteristics in terms of how data or control information is beam-formed in time, frequency, power and code dimensions. Also, these beams may have different beam shapes e.g., half-power beam-width (HPBW), electrical downtilt (EDT), azimuth, and transmission power (TXP). Furthermore, the beams may be optimized for certain services with corresponding data rate and/or reliability requirements. What is more, these beams could be overlaying. In such a setting, the wireless device may use a beam in a non-optimal manner resulting in a reduced or limited performance of the wireless communication network.

SUMMARY

An object of embodiments herein is to provide a mechanism that improves the performance of the wireless communication network when performing beamforming in a wireless communication network.

According to an aspect the object is achieved by providing a method performed by a wireless device for handling communication in a wireless communication network. The wireless device obtains an indication of one or more sets of reference signals, wherein each set is associated with one or more services. The wireless device further determines a service to use; and measures a signal strength or a quality of a reference signal of a set out of the one or more sets of reference signals, which set of reference signals is associated with the determined service.

According to another aspect the object is achieved by providing a method performed by a first radio network node for handling communication in a wireless communication network. The first radio network node transmits, to a wireless device or a second radio network node, an indication of one or more sets of reference signals, wherein each set is associated with one or more services.

According to yet another aspect the object is achieved by providing a method performed by a second radio network node for handling communication in a wireless communication network. The second radio network node receives, from a first radio network node, data informing how one or more sets of reference signals are associated with one or more services. The second radio network node then uses the data when configuring wireless devices in communication with the second radio network node.

It is herein also provided a computer program comprising instructions, which, when executed on at least one processor, causes the at least one processor to carry out the methods herein, as performed by the first radio network node, the second radio network node or the wireless device. Furthermore, it is herein provided a computer-readable storage medium, having stored thereon a computer program comprising instructions which, when executed on at least one processor, cause the at least one processor to carry out the methods herein, as performed by the first radio network node, the second radio network node or the wireless device.

According to still another aspect the object is achieved by providing a wireless device for handling communication in a wireless communication network. The wireless device is configured to obtain an indication of one or more sets of reference signals, wherein each set is associated with one or more services. The wireless device is further configured to determine a service to use, and to measure a signal strength or a quality of a reference signal of a set out of the one or more sets of reference signals, which set of reference signals is associated with the determined service.

According to yet still another aspect the object is achieved by providing a first radio network node for handling communication in a wireless communication network. The first radio network node is configured to transmit to a wireless device and/or a second radio network node, an indication of one or more sets of reference signals, wherein each set is associated with one or more services.

According to an additional aspect the object is achieved by providing a second radio network node for handling communication in a wireless communication network. The second radio network node is configured to receive, from a first radio network node, data informing how one or more sets of reference signals are associated with one or more services. The second radio network node is further configured to use the data when configuring wireless devices in communication with the second radio network node.

Embodiments herein allow a beam selection that is based on a RS configuration that is optimized per service in order to map wireless devices with the beams for certain services providing a more efficient handling of resources in the wireless communication network. This will lead to an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
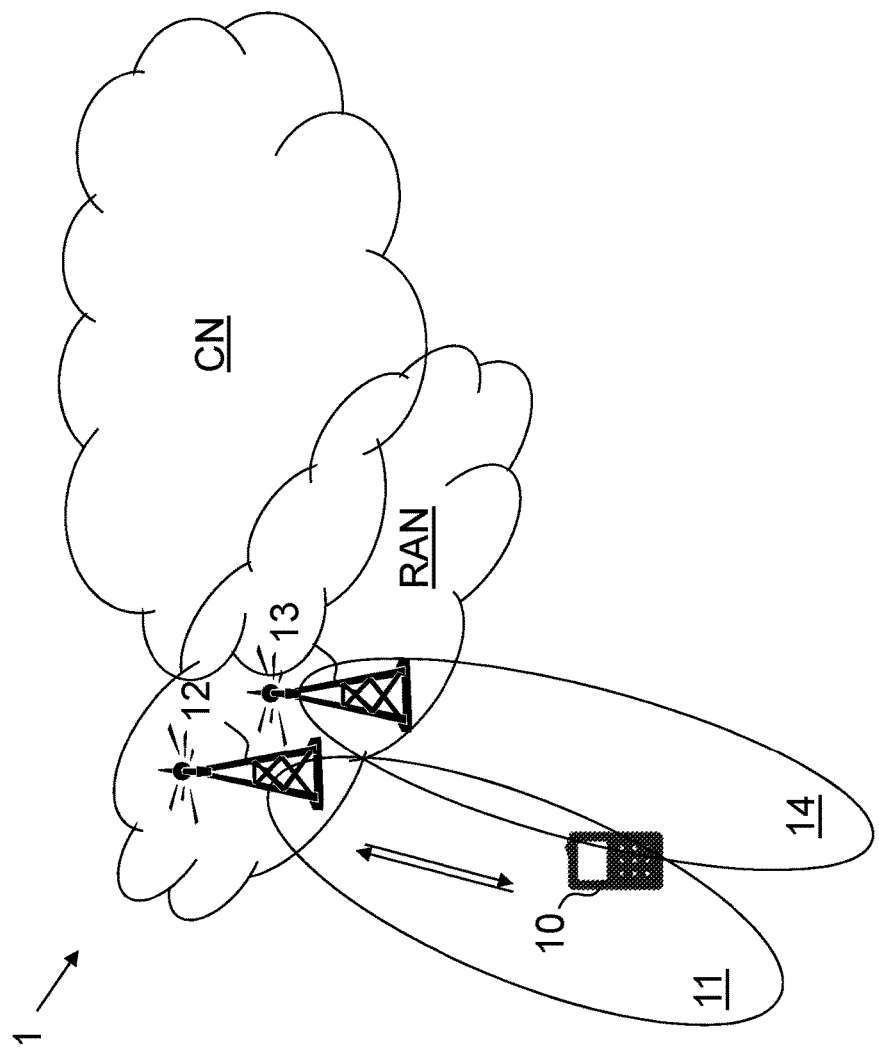
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use one or a number of different technologies, such as Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, and in particular relate to how the mobility reference signal (MRS) and the services could be associated in radio access networks and how the wireless devices/networks could benefit from that. However, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12, also referred to as merely the radio network node, providing radio coverage over a geographical area, a first service area 11 or a first beam, of a first radio access technology (RAT), such as NR, LTE, Wi-Fi, WiMAX or similar. The first radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the service area served by the first radio network node 12 depending e.g. on the first radio access technology and terminology used. The first radio network node 12 may be referred to as a serving network node wherein the first service area may be referred to as a serving beam, and the serving network node serves and communicates with the wireless device 10 in form of DL transmissions to the wireless device 10 and UL transmissions from the wireless device 10.

A second radio network node 13 may further provide radio coverage over a second service area 14 or a second beam of a second radio access technology (RAT), such as NR, LTE, Wi-Fi, WiMAX or similar. The first RAT and the second RAT may be the same or different RATs. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour network node wherein the second service area 14 may be referred to as a neighbouring beam or target beam.

It should be noted that a service area may be denoted as a cell, a beam, a mobility measurement beam, a beam group or similar to define an area of radio coverage. The radio network nodes transmit RSs over respective service area. Hence, the first and second radio network nodes may transmit MRSs or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g. first MRS, for identifying the first service area 11 in the wireless communication network 1. The second radio network node 13 provides radio coverage over the second service area 14 using a second reference signal, e.g. second MRS, for identifying the second service area 14 in the wireless communication network. These reference signals, first and second MRS, may be initiated upon request from a radio network node, e.g. a neighboring radio network node, or configured to be sent continuously.

According to embodiments herein the wireless device may receive a set of RSs e.g. service-specific subsets of MRSs, that belong to the beams of which each beam is optimized per a certain service, e.g. for a QoS class or a wireless device class or device category or network/RAN slice. Hence, the wireless device 10 is configured with different sets of Reference Signals (RS) for beamforming depending on one or more services available per beam or beam group. This enables that the wireless device 10 is mapped to a beam depending on the service in use. The beam selection and RS configuration may then be optimized per service and wireless device in order to map the wireless device 10 with a beam best suited for the service.

It should be noted that in a general scenario the term "radio network node" can be substituted with "transmission point". The key observation is that it must be possible to make a distinction between the transmission points (TPs), typically based on MRSs or different synchronization signals and BRSs transmitted. Several TPs may be logically connected to the same radio network node but if they are geographically separated, or are pointing in different propagation directions, the TPs will be subject to the same issues as different radio network nodes. In subsequent sections, the terms "radio network node" and "TP" can be thought of as interchangeable.

It should further be noted that a wireless communication network may be virtually network sliced into a number of Network/RAN slices, each Network/RAN slice supports one or more type of wireless devices and/or one or more type of services i.e. each network slice supports a different set of functionalities. Network slicing introduces the possibility that the network/RAN slices are used for different services and use cases and these services and use cases may introduce differences in the functionality supported in the different network slices. Each network/RAN slice may comprise one or more network nodes or elements of network nodes providing the services/functionalities for the respective network slice. Each network/RAN slice may comprise a network node such as a RAN node and/or a core network node.

Figure 2:
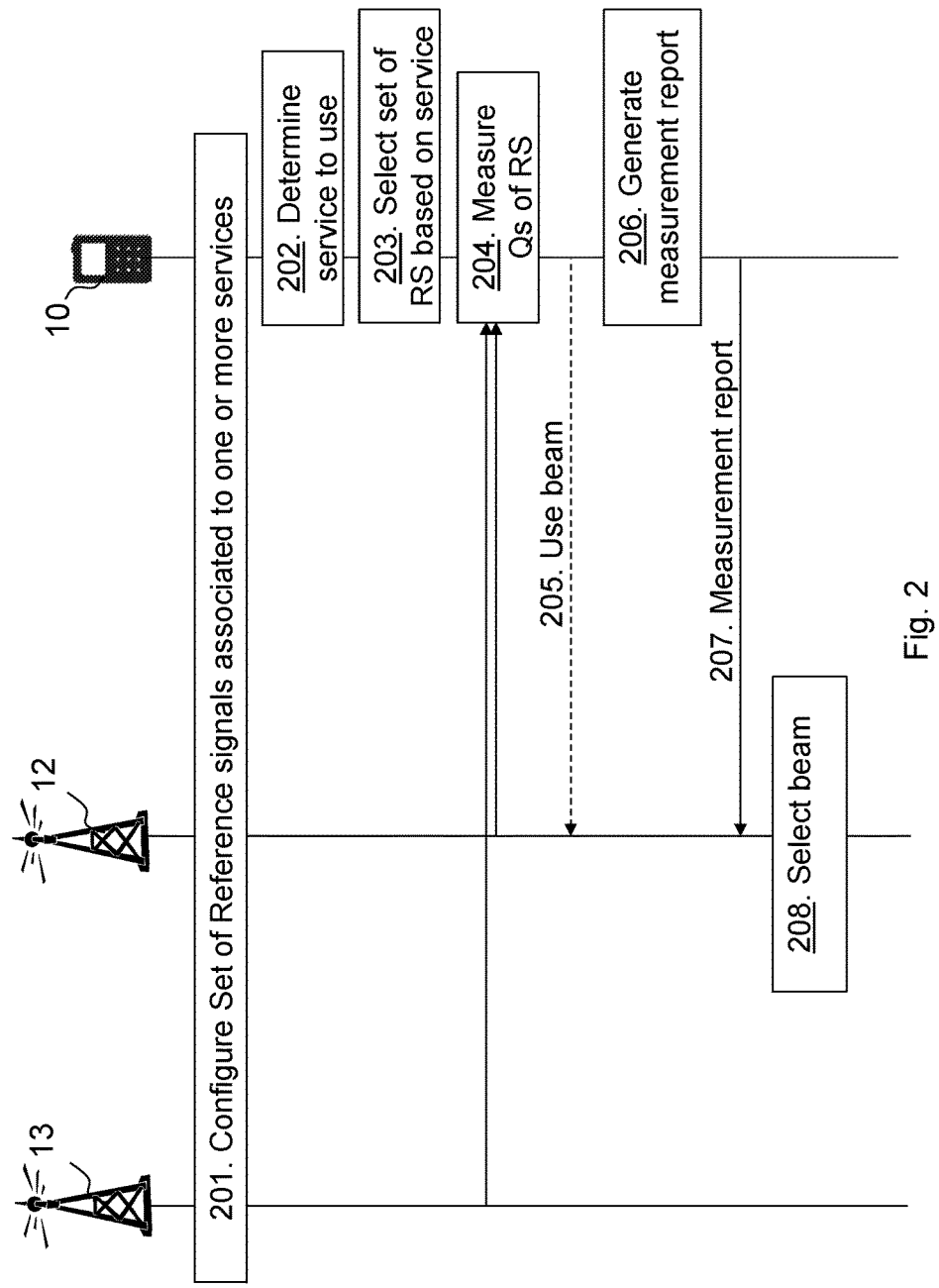
FIG. 2 is a schematic combined flowchart and signalling scheme according to embodiments herein.

FIG. 2 is a schematic combined flowchart and signalling scheme depicting some embodiments herein.

Action 201. The first radio network node 12 may configure the second radio network node 13 and the wireless device 10 with one or more sets of reference signals associated with one or more services.

Action 202. The wireless device 10 then determines the service to use.

Action 203. The wireless device 10 may then select set of RS to monitor based on the determined service to use.

Action 204. The wireless device 10 further receives and measures signal strength or quality (Q) of the selected set of RSs e.g. from both the first and the second radio network node. E.g. the wireless device 10 may determine which RS has a highest Q out of the set of RSs.

Action 205. The wireless device 10 may in some embodiments then use the beam corresponding to the RS e.g. with the highest Q.

Action 206. Alternatively, the wireless device 10 may generate a measurement report comprising measured signal strength or quality of one or more RSs of the selected set of RSs.

Action 207. The wireless device 10 may further transmit the measurement report to the first radio network node 12.

Action 208. The first radio network node 12 may then, based on the received measurement report and/or additional information, select RS or actually beam associated with the RS. This selection may be signaled to the wireless device 10 and the beam may then be used for the service.

Figure 3:
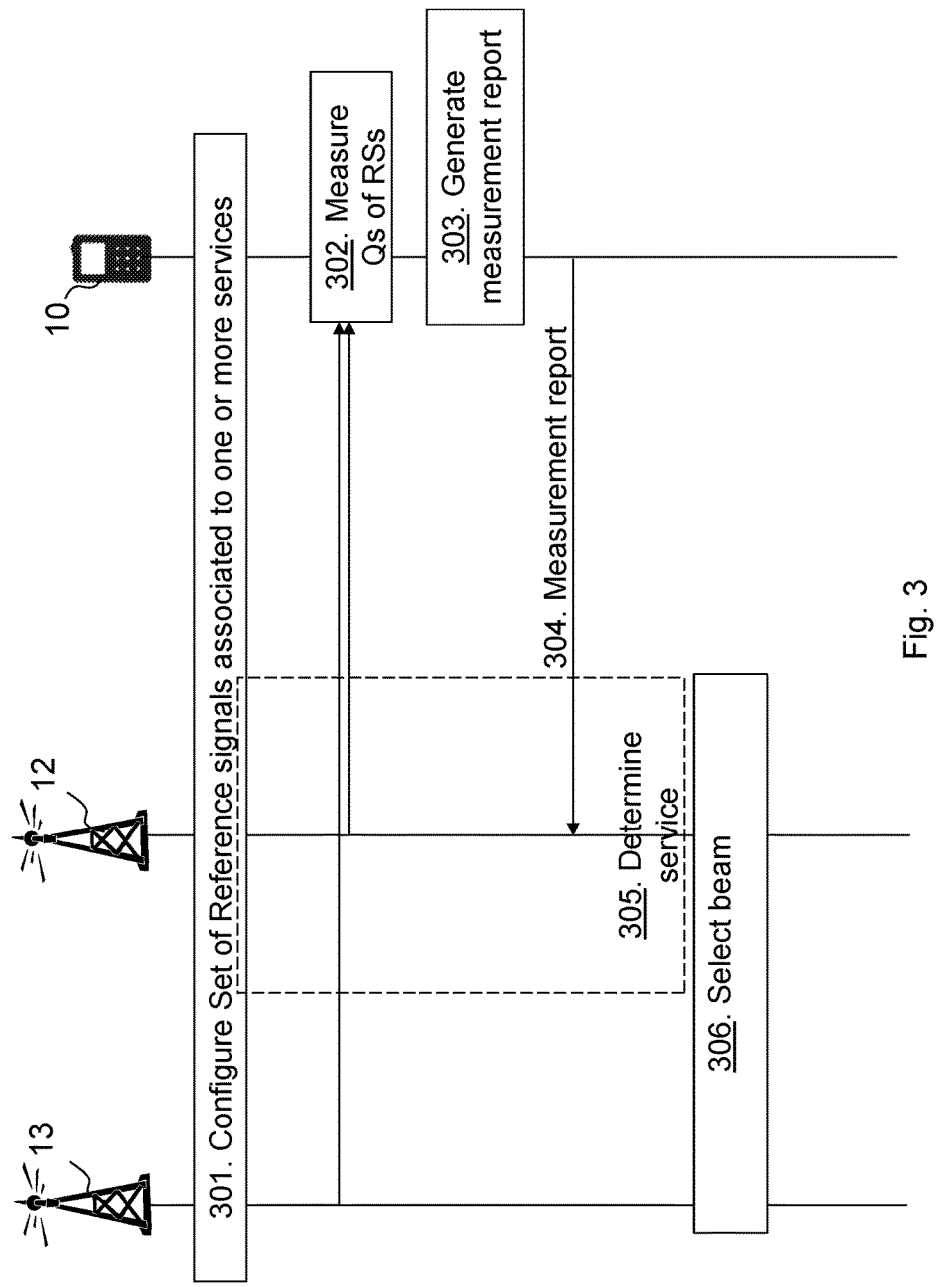
FIG. 3 is a schematic combined flowchart and signalling scheme according to embodiments herein.

FIG. 3 is a schematic combined flowchart and signalling scheme depicting some embodiments herein.

Action 301. The first radio network node 12 may configure the second radio network node 13 and the wireless device 10 with one or more sets of reference signals. Each set of RSs is associated with one or more services.

Action 302. The wireless device 10 further receives and measures signal strength or Q of RSs e.g. from both the first and the second radio network node. E.g. the wireless device 10 may determine which RS or RSs that have highest Qs out of the RSs measured.

Action 303. The wireless device 10 may generate a measurement report of the measured RSs e.g. having a higher Q, such as SINR or Signal to Noise Ratio (SNR), over a threshold.

Action 304. The wireless device 10 may further transmit the measurement report to the first radio network node 12.

Action 305. The first radio network node 12 may determine service to use for the wireless device 10. It should here be noted that the first radio network node 12 may in some embodiments determine service to use in action 301 and only transmit set of RSs related to that service to the wireless device 10.

Action 306. The first radio network node 12 may then, based on the received measurement report and the determined service to use, select RS or actually beam associated with the RS. This selection may be signaled to the wireless device 10 and/or the second radio network node 13 in case the selected RS is belonging to the second radio network node. The beam may then be used for the determined service.

Figure 4:
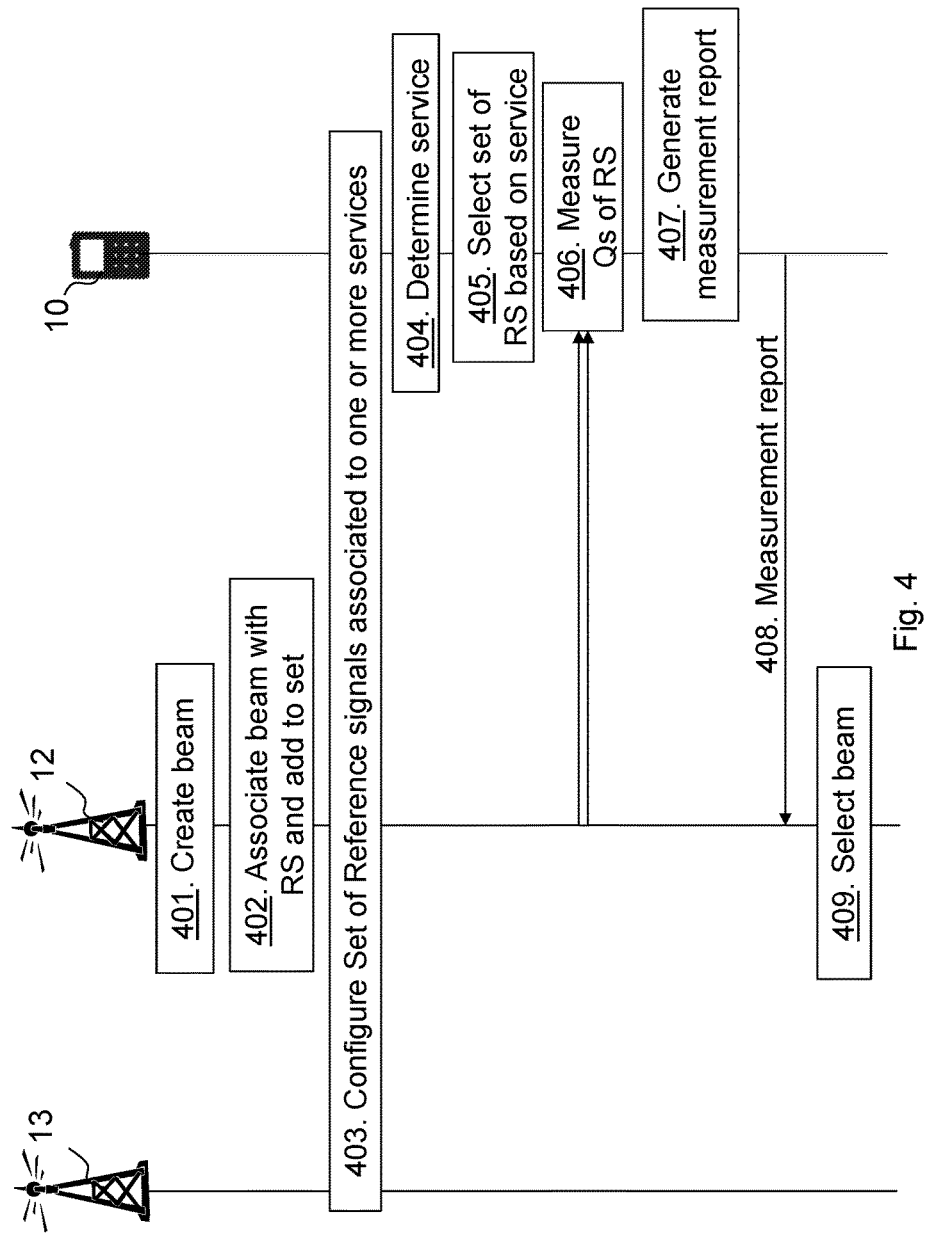
FIG. 4 is a schematic combined flowchart and signalling scheme according to embodiments herein.

FIG. 4 is a schematic combined flowchart and signalling scheme depicting some embodiments herein.

Action 401. The first radio network node 12 may create one or more beams adjusted for one or more services. Differently shaped beams may be created by shaping a signal with different weightings, e.g. phases and amplitudes, per antenna element.

Action 402. The first radio network node 12 may further associate one or more reference signals to a respective created beam, and add that one or more RSs to a set of RSs for that one or more services.

Action 403. The first radio network node 12 may furthermore configure the second radio network node 13 and the wireless device 10 with e.g. the set of Reference signals associated with the one or more services.

Action 404. The wireless device 10 then determines the service to use, being a service out of the one or more services.

Action 405. The wireless device 10 may then select the set of RSs to monitor based on the determined service to use.

Action 406. The wireless device further receives and measures quality, such as SINR or SNR, of the selected set of RSs e.g. from both the first and the second radio network node. E.g. the wireless device 10 may determine which RS has a highest Q out of the selected set of RSs.

Action 407. The wireless device 10 may generate a measurement report of the measured set of RS. The measurement report may comprise measured values of one or more RSs and indications of the respective RS, e.g. ID, index or similar.

Action 408. The wireless device 10 may further transmit the measurement report to the first radio network node 12.

Action 409. The first radio network node 12 may then, based on the received measurement report, select RS or actually beam associated with the RS. This selection may be signaled to the wireless device 10 and the beam may then be used for the service.

Figure 5:
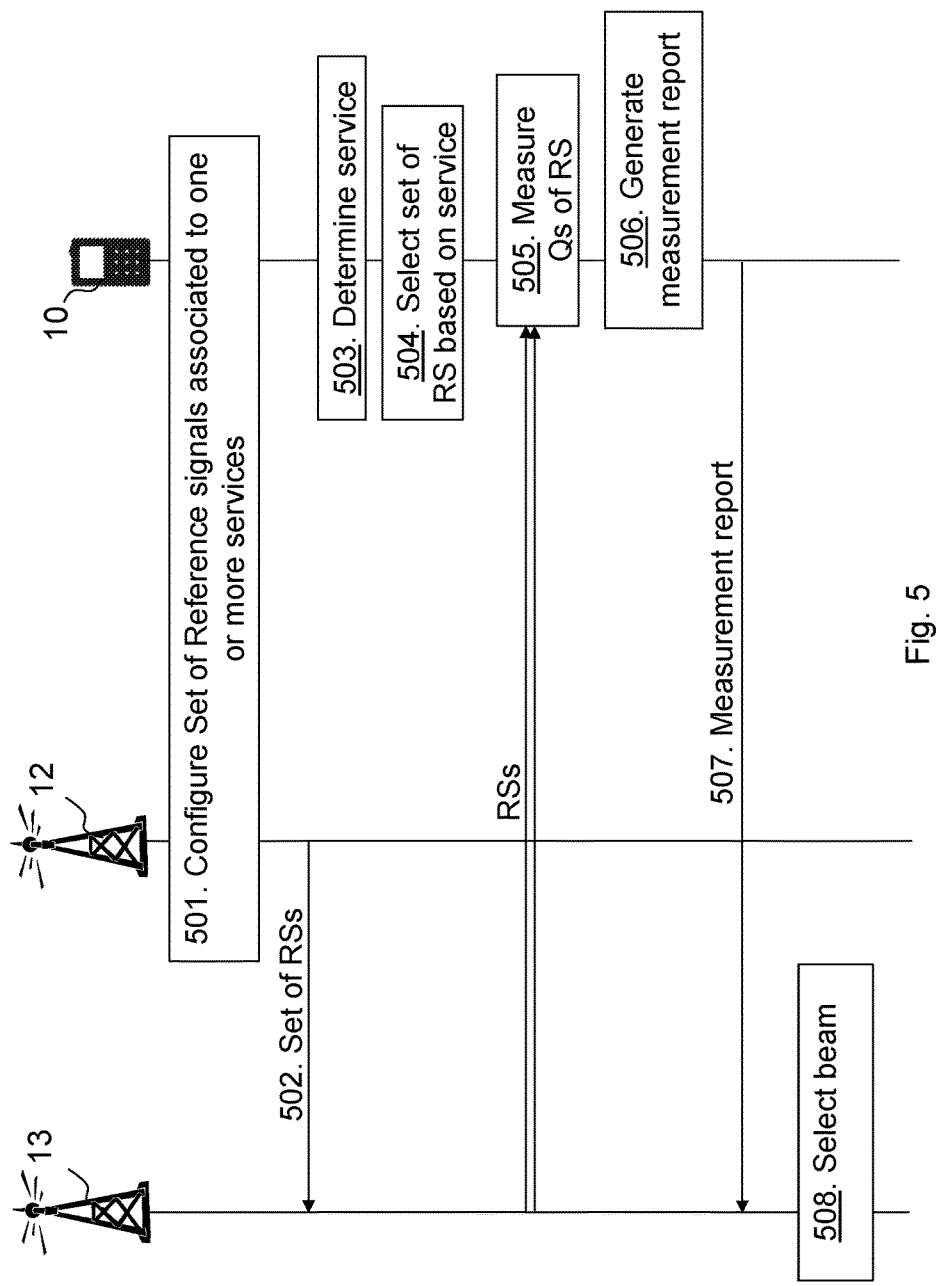
FIG. 5 is a schematic combined flowchart and signalling scheme according to embodiments herein.

FIG. 5 is a schematic combined flowchart and signalling scheme depicting some embodiments herein.

Action 501. The first radio network node 12 may configure the wireless device 10 with one or more sets of reference signals associated with one or more services.

Action 502. The first radio network node 12 may then transmit indications of RSs or setting of the RSs for the second radio network node 13 to the second radio network node 13. E.g. the first radio network node 12 may transmit to the second radio network node 13, data informing how the one or more sets of reference signals are associated with the one or more services.

Action 503. The wireless device 10 then determines the service to use.

Action 504. The wireless device 10 may then select set of RSs to monitor based on the determined service to use. In this example the RSs selected are RSs transmitted from the second radio network node 13.

Action 505. The wireless device 10 further receives and measures signal strength or quality (Q) of the selected set of RSs e.g. from the second radio network node 13. E.g. the wireless device 10 may determine which RS from the second radio network node 13 has a highest Q out of the selected set of RSs.

Action 506. The wireless device 10 may generate the measurement report of the measured set of RSs.

Action 507. The wireless device 10 may further transmit the measurement report to the second radio network node 13.

Action 508. The second radio network node 13 may then, based on the received measurement report, select RS or actually beam associated with the RS. It should be noted that the measurement report may alternatively be transmitted to the first radio network node 12 performing the selection. This selection may be signaled to the wireless device 10 and the selected beam may then be used for the service. In case the first radio network node 12 performs the selection, an indication of the selection may also be transmitted to the second radio network node 13.

Figure 6:
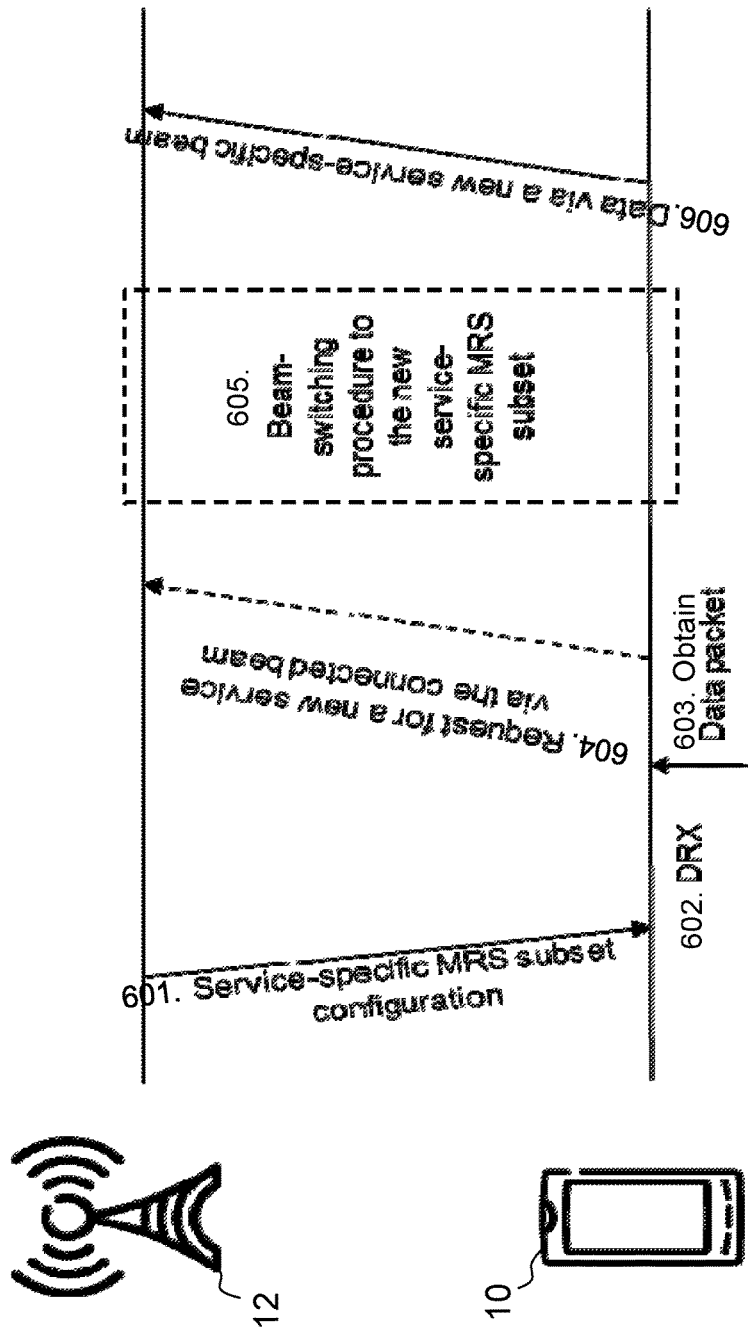
FIG. 6 is a signalling scheme according to embodiments herein.

FIG. 6 is a schematic signalling scheme depicting embodiments herein.

Action 601. The first radio network node 12 configures or transmits configuration parameters related to one or more reference signals of the one or more sets of reference signals, wherein each set is associated with one or more services. E.g. the first radio network node 12 may transmit service specific MRS subset configuration to the wireless device 10.

Action 602. The wireless device 10 may then use these configurations parameters during a service and after using these configurations parameters may enter in a DRX mode not communicating in the wireless communication network 1.

Action 603. The wireless device 10 may then obtain a data packet for transmission associated with a new service.

Action 604. The wireless device 10 may transmit a request for the service via the connected beam.

Action 605. The first radio network node 12 then initiates a beam switching procedure together with the wireless device 10 to a new service specific MRS subset.

Action 606. The wireless device 10 may then transmit data via a new service specific beam to the first radio network node 12.

Figure 7:
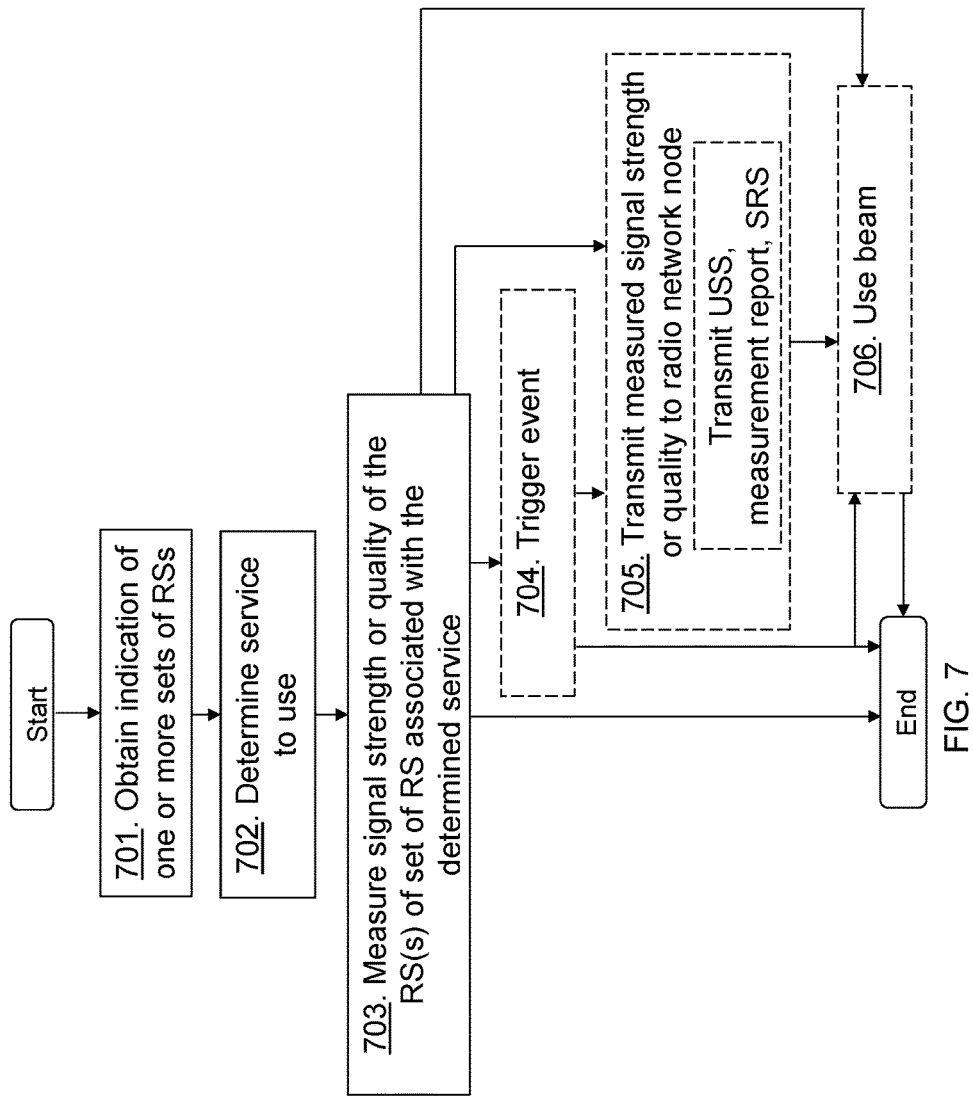
FIG. 7 is a schematic flowchart depicting a method performed by a wireless device according to embodiments herein.

FIG. 7 is a schematic flowchart depicting a method performed by the wireless device 10 for handling communication in the wireless communication network 1. The actions do not have to be taken in the order stated below, but may be taken in any suitable order. Actions performed in some embodiments are marked with dashed boxes. The wireless device may be served by the first radio network node 12 providing radio coverage over the first service area 11 using the first reference signal for identifying the first service area 11 in the wireless communication network. The second radio network node 13 may provide radio coverage over the second service area 14 using the second reference signal for identifying the second service area 14 in the wireless communication network 1.

Action 701. The wireless device 10 obtains the indication of one or more sets of reference signals, wherein each set is associated with one or more services. A set may comprise one or more reference signals. For example, the wireless device 10 may obtain the indication by obtaining configuration parameters related to one or more reference signals of the one or more sets of reference signals. This is exemplified in actions 201, 301, 403, 501, 601 and 605 in the exemplifying figures above. The wireless device 10 may obtain the indication by receiving the indication from the first radio network node 12 or retrieving the indication internally of the wireless device 10, e.g. as preconfigured or similar. The indication may comprise an ID associated with the reference signals, such as RS ID or beam ID, or the wireless device 10, such as the ID of the wireless device 10. Each set may be associated with the one or more services by being mapped to a class of services e.g. a QoS class or a type of wireless device. The wireless device may be configured with a number of RSs (not service specific) when there is no data transmission and/or no RAN slice association but the wireless device 10 is in a Radio Resource Control (RRC)-connected state. In some embodiments, the wireless device 10 may be configured with a set of RSs that is only relevant to the currently used or requested service/RAN slice. Later, the set of RSs may be re-configured by receiving an indication of a newly added RS to the set and/or removed one or all RSs. The set of RSs may be activated or deactivated, e.g. by Layer 1/Layer 2 signalling, from the first or the second radio network node.

Action 702. The wireless device determines the service to use. This is exemplified in actions 202, 404, and 503 in the exemplifying figures above.

Action 703. The wireless device 10 then measures the signal strength or the quality of the reference signal of the set out of the one or more sets of reference signals. The set of reference signals being associated with the determined service. This is exemplified in actions 204, 302, 406, and 505 in the exemplifying figures above.

Action 704. The wireless device 10 may then trigger an event when the measured signal strength or quality fulfils a condition, e.g. the event may be transmission of SRS or measurement report when signal strength or quality is above a threshold or similar.

Action 705. The wireless device 10 may transmit the measured signal strength or quality of the reference signal to a radio network node such as the first or the second radio network node 13 in the wireless communication network. This is exemplified in actions 207, 304, 408, and 507 in the exemplifying figures above. For example, the wireless device 10 may transmit a measurement report, a sounding reference signal (SRS) or an uplink synchronization signal (USS) when the event is triggered, e.g. when the measured signal strength or quality is above the threshold, and based on the set of reference signals measured on. The measurement report may indicate the measured signal strength or quality of a selected reference signal e.g. having a highest signal strength or quality. In some embodiments, whether the wireless device 10 transmits measurement report, SRS or USS depends on the set of reference signals that the transmission is related with. Similarly, whether the wireless device 10 applies UL- or DL-based mobility procedure or Layer 1/Layer 2- or Layer 3-based signalling could depend on whether the related RS belongs to a set of RSs associated with a certain service or not. The radio network node who makes the decision for beam-switching may be different for different services and in different beams thereof. For instance, in some embodiments the measurement report may be sent to the first radio network node and the first radio network node 12 may decide whether the wireless device 10 should go to one of the reported beams or not, in other embodiments the wireless device 10 could simply try to synchronize with the beam it selects based on the measurements it made.

Action 706. The wireless device 10 may in some embodiments use the beam corresponding to the measured reference signal for communicating data in the wireless communication network. This is exemplified in action 205 in the exemplifying figures above.

Figure 8:
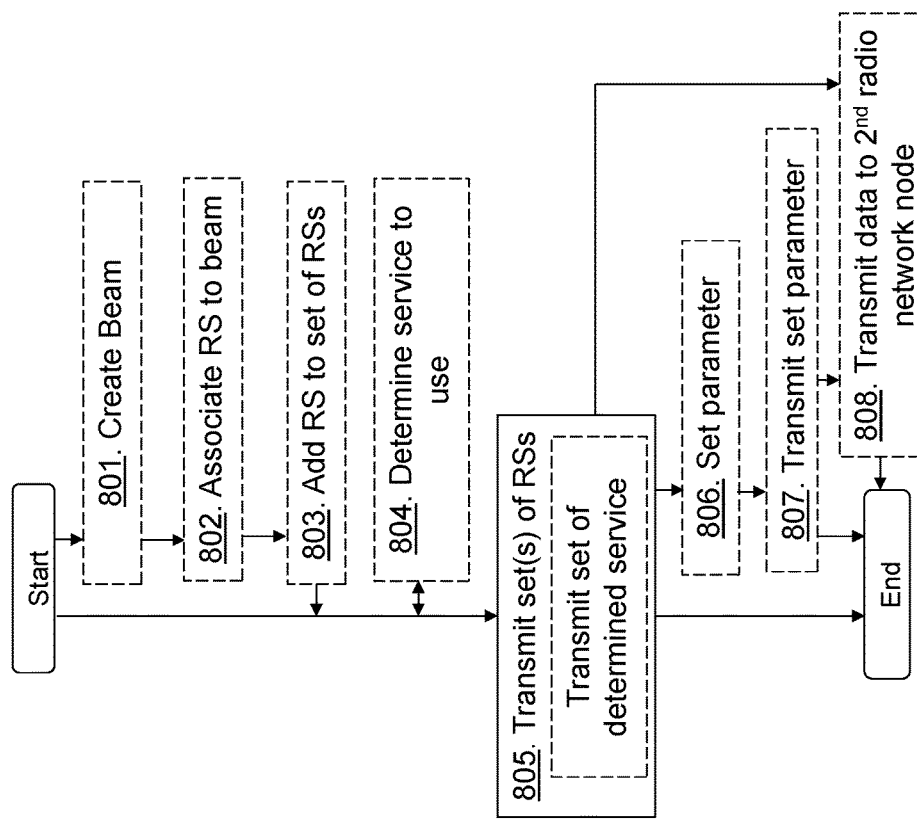
FIG. 8 is a schematic flowchart depicting a method performed by a wireless device according to embodiments herein.

The method actions performed by the first radio network node 12, exemplified herein the first radio base station serving the wireless device 10, for communication in the wireless communication network according to some embodiments will now be described with reference to a flowchart depicted in FIG. 8. The actions do not have to be taken in the order stated below, but may be taken in any suitable order. Actions performed in some embodiments are marked with dashed boxes.

Action 801. The first radio network node 12 may create one or more beams adjusted for at least one service. For example, the first radio network node 12 may create differently shaped beams by shaping the signal with different weightings, e.g. different phases and/or amplitudes, per antenna element. This is exemplified in action 401 in the exemplifying figures above.

Action 802. The first radio network node 12 may then further associate a reference signal to a respective created beam. This is exemplified in action 402 in the exemplifying figures above.

Action 803. The first radio network node 12 may also add the reference signal to the set out of the one or more sets of reference signals. The set being associated with at least one service. This is exemplified in action 402 in the exemplifying figures above. E.g. the set is for a certain service e.g. a URLLC service. The set of RSs may be configured per service class which may depend on a wireless device category. For instance, ultra-reliable low-latency (URLLC) services may not be supported for all the wireless device categories, then a set of RSs may not need to be configured for all the wireless devices, only for the wireless devices supporting the URLLC service, minimizing the signalling and used resources.

Action 804. The first radio network node 12 may determine the service for the wireless device 10. This is exemplified in action 305 in the exemplifying figures above.

Action 805. The first radio network node 12 transmits, to the wireless device 10 or the second radio network node 13, the indication of the one or more sets of reference signals, wherein each set is associated with one or more services. The first radio network node 12 may transmit the indication of the set of reference signals associated with the determined service. This is exemplified in actions 201, 301, 403, 501, 601 and 605 in the exemplifying figures above. For example, the first radio network node 12 may transmit, to the wireless device 10, a number of sets of RSs for the wireless device 10 and also a subset or subsets of these number of sets of RSs that are service-specific subsets of RSs. These service-specific subsets may be informed separately than the number of sets of RSs. In this case, the wireless device 10 may only use a subset out of these number of sets of RSs depending on the service that wireless device 10 is using or requesting to use. Each set may be associated with the one or more services by being mapped to the class of services e.g. the QoS class or the type of wireless device. It should be noted that even though a service is supported by the wireless device 10, if the service is not in use (and/or no active RAN slice) or requested by the wireless device 10, then the first radio network node 12 may not configure the wireless device 10 with that set associated with the service. Alternatively, the first radio network node 12 may transmit or configure the wireless device 10 with all the available sets of RSs related to any service regardless of whether the wireless device 10 supports the service or not. In some embodiments, the wireless device 10 may be configured with a set of RSs that is only relevant to the currently used or requested service/RAN slice. Later, the set of RSs may be re-configured by adding a new RS to the set and/or removing one or all RSs or a set of RSs from the previously transmitted or configured set or sets and this updated set, or an indication of the added or removed RS, may be transmitted to the wireless device 10. The configured set of RSs may be activated or deactivated, e.g. by Layer 1/Layer 2 signalling, to the wireless device 10, depending on the performance of the on-going service or beam specific resource conditions. As stated above the indication may comprise the ID associated with the reference signals, such as RS ID or beam ID, or the wireless device 10, such as the ID of the wireless device 10. Hence, if the RSs of the set or sets are indicated implicitly e.g., not using beam IDs/RS info but by configuring the wireless device 10 with a cell ID and/or radio network node ID and/or RS set ID (that the beams are mapped to), then these IDs (instead of beam IDs/RSs) can form the set per service when configuring the wireless device 10. The first radio network node 12 may configure the wireless device 10 with the set of RS associated with the service by black/white listing relevant RSs per service. The indication may be transmitted via dedicated signalling e.g. RRC/Layer 3, per wireless device and/or by a broadcast signal for more than one wireless device. In some embodiments, a Handover (HO) command/RRC re-configuration may be used for transmitting the indication.

Action 806. The first radio network node 12 may set a parameter for reporting measurements at the wireless device based on the one or more services. E.g. the first radio network node 12 may set periodicity of the reporting which periodicity is based on the service in use or requested to use. When the wireless device 10 is running services requiring more reliable Radio Resource Management (RRM) measurements, e.g. URLLC wireless devices the RSs of the one or more services may be transmitted more frequently i.e., transmitted with a shorter periodicity.

Action 807. The first radio network node 12 may further transmit the set parameter to the wireless device 10 and/or the second radio network node 13. This set parameter may also be informed to a neighboring radio network node such as the second radio network node 13 so that the second radio network node also can adjust its periodicities for the wireless device that may be handed over. The first radio network node 12 may also require potential other radio network nodes to transmit a larger number of RSs.

Action 808. The first radio network node 12 may transmit, to the second radio network node 13, data informing how the one or more sets of reference signals are associated with the one or more services. This is exemplified in action 502 in the exemplifying figures above.

It should further be understood that the first radio network node 12 may receive the measurement report from the wireless device 10. In addition, the first radio network node 12 may then, based on the received measurement report, select RS or actually beam associated with the RS, and the beam may be used for the service.

Figure 9:
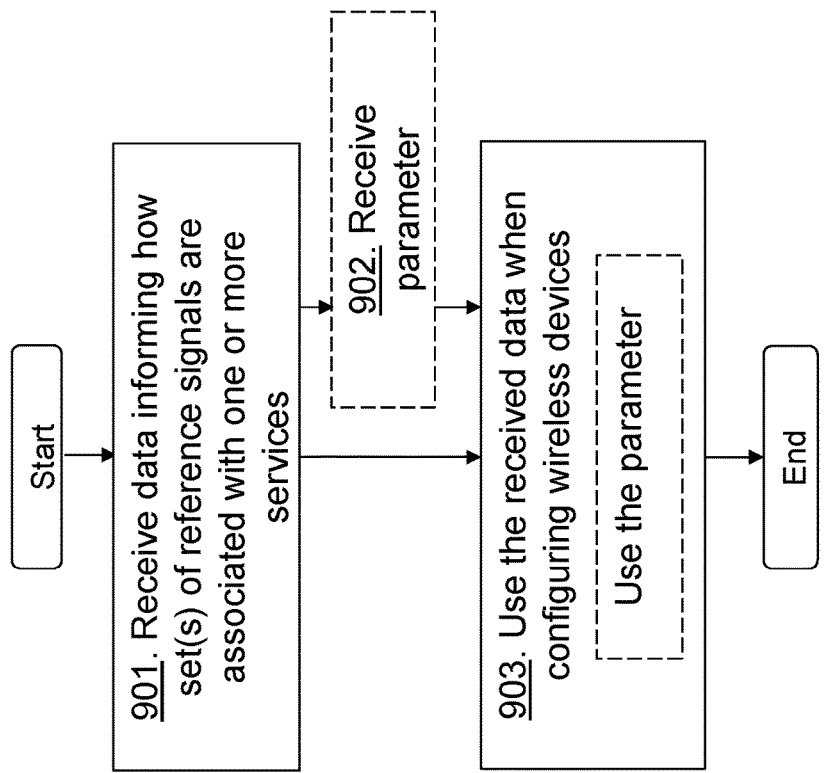
FIG. 9 is a schematic flowchart depicting a method performed by a wireless device according to embodiments herein.

The method actions performed by the second radio network node 13 for communication in the wireless communication network according to some embodiments will now be described with reference to a flowchart depicted in FIG. 9. The actions do not have to be taken in the order stated below, but may be taken in any suitable order. Actions performed in some embodiments are marked with dashed boxes.

Action 901. The second radio network node 13 receives, from the first radio network node 12, data informing how one or more sets of reference signals are associated with one or more services.

Action 902. The second radio network node 13 may further receive, from the first radio network node 12, the parameter for reporting measurements at the wireless device based on the one or more services.

Action 903. The second radio network node 13 uses the data when configuring wireless devices in communication with the second radio network node. The second radio network node 13 may further use the parameter when configuring the wireless devices in communication with the second radio network node. For example, the second radio network node may adjust its periodicities of transmitting RSs for the wireless device that may be handed over.

Figure 10:
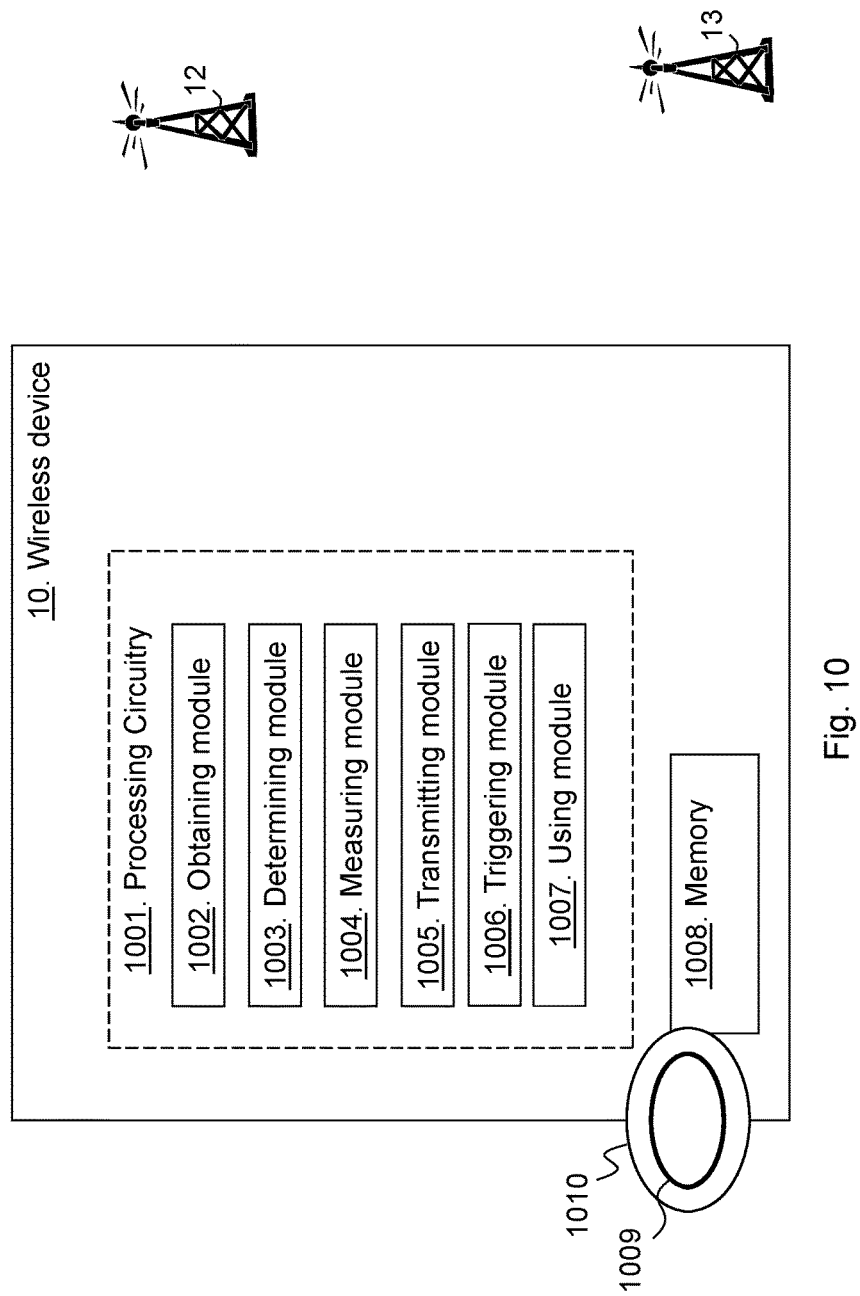
FIG. 10 is a block diagram depicting a wireless device according to embodiments herein.

FIG. 10 is a block diagram depicting the wireless device 10 according to embodiments herein for handling communication in the wireless communication network.

The wireless device 10 may be configured to be served by the first radio network node 12 providing radio coverage over the first service area 11 using the first reference signal for identifying the first service area 11 in the wireless communication network 1.

The wireless device 10 may comprise a processing circuitry 1001, e.g. one or more processors, configured to perform the methods herein.

The wireless device 10 may comprise an obtaining module 1002, e.g. a receiver or a transceiver. The wireless device 10, the processing circuitry 1001, and/or the obtaining module 1002 is configured to obtain the indication of one or more sets of reference signals, wherein each set is associated with one or more services. The wireless device 10, the processing circuitry 1001, and/or the obtaining module 1002 may be configured to obtain the indication by being configured to obtain configuration parameters related to one or more reference signals of the one or more sets of reference signals. The wireless device 10, the processing circuitry 1001, and/or the obtaining module 1002 may be configured to obtain the indication by being configured to receive the indication from the first radio network node or to retrieve the indication internally of the wireless device. The indication may comprise the ID associated with the reference signals or the wireless device, e.g. BRS ID, wireless device ID or similar. Each set may be associated with the one or more services by being mapped to the class of services.

The wireless device 10 may comprise a determining module 1003. The wireless device 10, the processing circuitry 1001, and/or the determining module 1003 is configured to determine the service to use.

The wireless device 10 may comprise a measuring module 1004. The wireless device 10, the processing circuitry 1001, and/or the measuring module 1004 is configured to measure the signal strength or the quality of the reference signal of the set out of the one or more sets of reference signals, which set of reference signals is associated with the determined service.

The wireless device 10 may comprise a transmitting module 1005, e.g. a transmitter or a transceiver. The wireless device 10, the processing circuitry 1001, and/or the transmitting module 1005 may be configured to transmit the measured signal strength or quality of the reference signal to the first radio network node 12 in the wireless communication network.

The wireless device 10 may comprise a triggering module 1006. The wireless device 10, the processing circuitry 1001, and/or the triggering module 1006 may be configured to trigger the event when the measured signal strength or quality fulfils the condition.

The wireless device 10, the processing circuitry 1001, and/or the transmitting module 1005 may be configured to transmit the measurement report, the sounding reference signal or the uplink synchronization signal when the event is triggered and based on the set of reference signals measured on.

The wireless device 10 may comprise a using module 1007. The wireless device 10, the processing circuitry 1001, and/or the using module 1007 may be configured to use the beam corresponding to the measured reference signal for communicating data in the wireless communication network.

The wireless device 10 further comprises a memory 1008. The memory comprises one or more units to be used to store data on, such as set of RSs, services, event, condition, strengths or qualities, applications to perform the methods disclosed herein when being executed, and similar.

The methods according to the embodiments described herein for the wireless device 10 are respectively implemented by means of e.g. a computer program 1009 or a computer program product, comprising instructions, i.e., software code portions, which, when executed on at least one processor, cause the at least one processor to carry out the actions described herein, as performed by the wireless device 10. The computer program 1009 may be stored on a computer-readable storage medium 1010, e.g. a disc or similar. The computer-readable storage medium 1010, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

Figure 11:
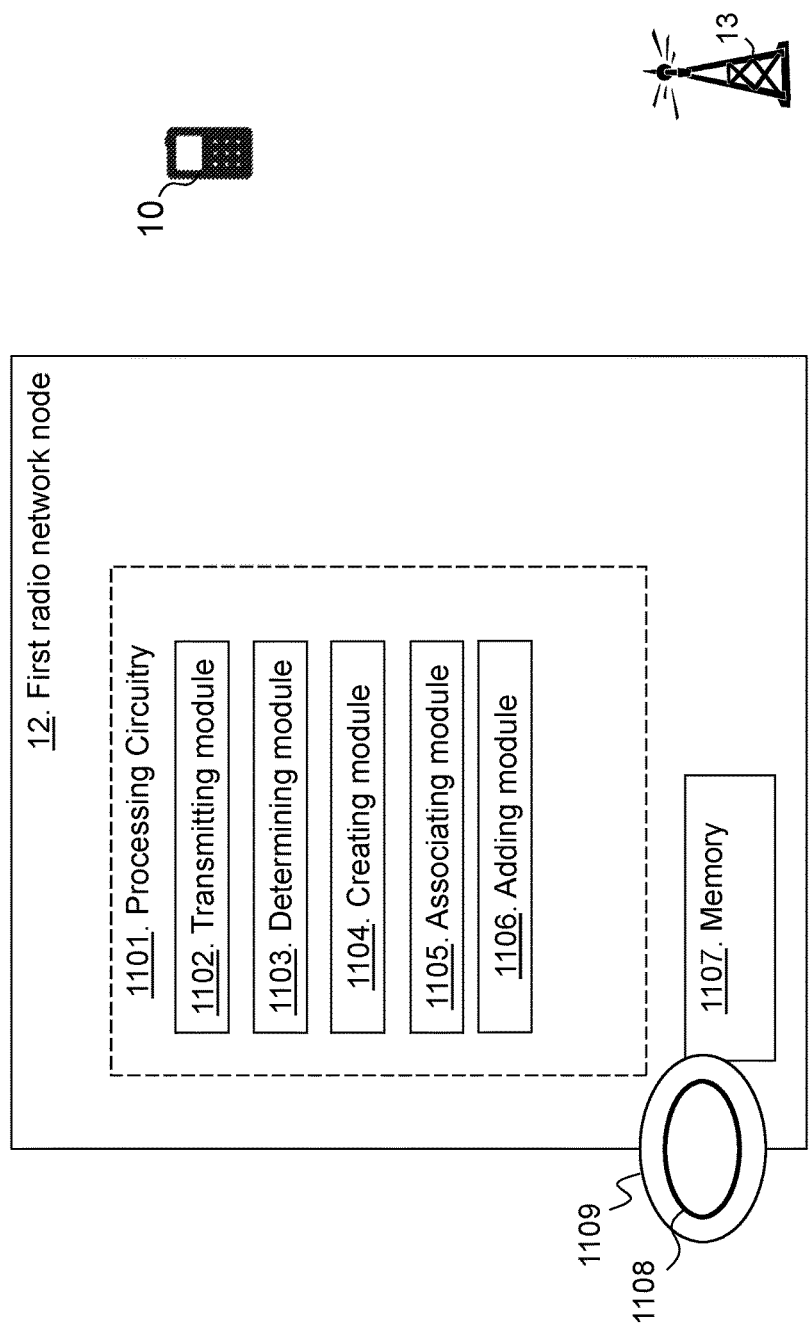
FIG. 11 is a block diagram depicting a first radio network node according to embodiments herein.

FIG. 11 is a block diagram depicting the first radio network node 12 according to embodiments herein for handling communication in the wireless communication network.

The first radio network node 12 may comprise a processing circuitry 1101, e.g. one or more processors, configured to perform the methods herein.

The first radio network node 12 may comprise a transmitting module 1102, e.g. a transmitter or a transceiver. The first radio network node 12, the processing circuitry 1101, and/or the transmitting module 1102 is configured to transmit to the wireless device 10 and/or the second radio network node 13, the indication of one or more sets of reference signals, wherein each set is associated with one or more services. The first radio network node 12, the processing circuitry 1101, and/or the transmitting module 1102 may be configured to transmit, to the second radio network node (13), data informing how the one or more sets of reference signals are associated with the one or more services.

The first radio network node 12 may comprise a determining module 1103. The first radio network node 12, the processing circuitry 1101, and/or the determining module 1103 may be configured to determine the service for the wireless device 10. The first radio network node 12, the processing circuitry 1101, and/or the transmitting module 1102 may be configured to transmit the indication of the set of reference signals associated with the determined service.

The first radio network node 12 may comprise a creating module 1104. The first radio network node 12, the processing circuitry 1101, and/or the creating module 1104 may be configured to create one or more beams adjusted for at least one service.

The first radio network node 12 may comprise an associating module 1105. The first radio network node 12, the processing circuitry 1101, and/or the associating module 1105 may be configured to associate the reference signal to the respective created beam.

The first radio network node 12 may comprise an adding module 1106. The first radio network node 12, the processing circuitry 1101, and/or the adding module 1106 may be configured to add the reference signal to the set out of the one or more sets of reference signals, which set is associated with the at least one service.

The first radio network node 12 may comprise a setting module 1106. The first radio network node 12, the processing circuitry 1101, and/or the adding module 1106 may be configured to set the parameter, e.g. the periodicity, for reporting measurements at the wireless device based on the one or more services. The first radio network node 12, the processing circuitry 1101, and/or the transmitting module 1102 may further be configured to transmit the set parameter to the wireless device and/or the second radio network node 13.

The first radio network node 12 further comprises a memory 1107. The memory comprises one or more units to be used to store data on, such as set of RSs, services, event, condition, strengths or qualities, parameters, applications to perform the methods disclosed herein when being executed, and similar.

The methods according to the embodiments described herein for the first radio network node 12 are respectively implemented by means of e.g. a computer program 1108 or a computer program product, comprising instructions, i.e., software code portions, which, when executed on at least one processor, cause the at least one processor to carry out the actions described herein, as performed by the first radio network node 12.

The computer program 1108 may be stored on a computer-readable storage medium 1109, e.g. a disc or similar. The computer-readable storage medium 1109, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

Figure 12:
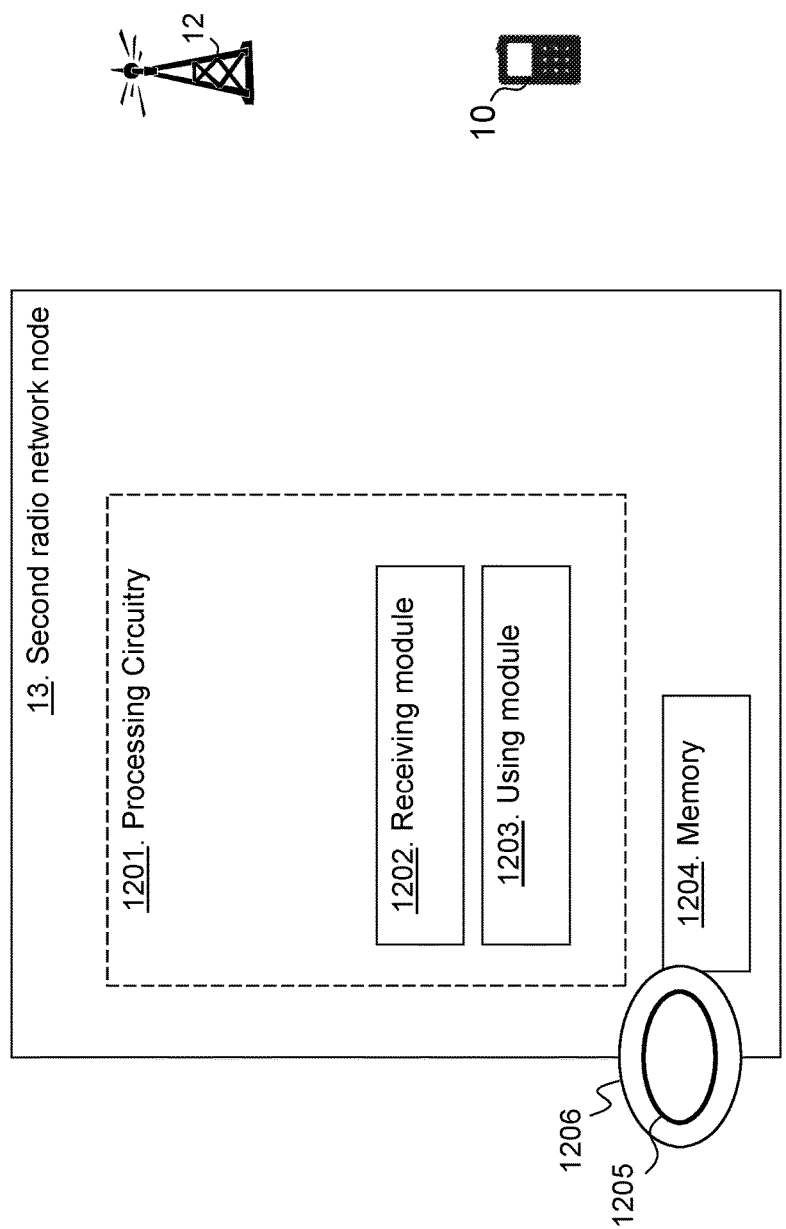
FIG. 12 is a block diagram depicting a second radio network node according to embodiments herein.

FIG. 12 is a block diagram depicting the second radio network node 13 according to embodiments herein for handling communication in the wireless communication network.

The second radio network node 13 may comprise a processing circuitry 1201, e.g. one or more processors, configured to perform the methods herein.

The second radio network node 13 may comprise a receiving module 1202, e.g. a receiver or a transceiver. The second radio network node 13, the processing circuitry 1201, and/or the receiving module 1202 is configured to receive, from the first radio network node 12, data informing how the one or more sets of reference signals are associated with the one or more services.

The second radio network node 13 may comprise a using module 1203. The second radio network node 13, the processing circuitry 1201, and/or the using module 1203 is configured to use the data when configuring wireless devices in communication with the second radio network node.

The second radio network node 13 further comprises a memory 1204. The memory comprises one or more units to be used to store data on, such as set of RSs, services, event, condition, strengths or qualities, parameters, applications to perform the methods disclosed herein when being executed, and similar.

The second radio network node 13, the processing circuitry 1201, and/or the receiving module 1202 may be configured to receive, from the first radio network node 12, the parameter for reporting measurements at a wireless device based on the one or more services. Then the second radio network node 13, the processing circuitry 1201, and/or the using module 1203 may be configured to use the parameter when configuring wireless devices in communication with the second radio network node. For example, may transmit to the wireless device the periodicity of the reference signals.

The methods according to the embodiments described herein for the second radio network node 13 are respectively implemented by means of e.g. a computer program 1204 or a computer program product, comprising instructions, i.e., software code portions, which, when executed on at least one processor, cause the at least one processor to carry out the actions described herein, as performed by the second radio network node 13. The computer program 1204 may be stored on a computer-readable storage medium 1205, e.g. a disc or similar. The computer-readable storage medium 1205, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

Measurement Reference Signal (MRS): As used herein, a "MRS" is any signal used for mobility measurements in Mobility measurement beams. Thus, while the term "MRS" is used herein to refer a signal used herein, the term "MRS" is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purposes. This reference signal can be periodic or aperiodic. It can be configured to be wireless device specific or could be used common for more than one wireless device.

Antenna node: As used herein, an "antenna node" is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication in a wireless communication network, the method comprising:
 identifying a set of reference signals to use for performing mobility measurements at the wireless device, based on configuration information and a communication service type or class in use or to be used by the wireless device, wherein the configuration information associates different communication service classes or types with corresponding sets of reference signals used at one or more radio network nodes in the wireless communication network for managing mobility of wireless devices operating within service areas corresponding to the one or more radio network nodes;

performing the mobility measurements on one or more reference signals in the identified set of reference signals; and transmitting an indication of the mobility measurements to one or more of the one or more radio network nodes.

2. The method according to claim 1, wherein the identified set of reference signals includes at least one reference signal, wherein each included reference signal corresponds to a beam, and wherein the method includes the wireless device selecting, based on the mobility measurements, one of the corresponding beams to use for communicating in the wireless communication network, for the communication service type or class that is in use or to be used by the wireless device.

3. The method according to claim 1, wherein transmitting the indication of the mobility measurements to one or more of the one or more radio network nodes comprises transmitting the indication on a triggered basis, responsive to determining that a measured signal strength or quality of the one or more reference signals considered in the mobility measurements fulfills a condition.

4. The method according to claim 1, wherein transmitting the indication of the mobility measurements comprises transmitting one of:

a measurement report, a sounding reference signal, or an uplink synchronization signal.

5. The method according to claim 1, wherein each corresponding set of reference signals comprises a set of reference signals associated with a respective beam group, such that different beam groups are associated with the different communication service classes or types, and wherein transmitting the indication of the mobility measurements provides the one or more radio network nodes with an indication of a best beam within the beam group for providing the communication service or type.

6. The method according to claim 1, further comprising receiving the configuration information from one or more of the one or more radio network nodes.

7. A method performed by a first radio network node in a wireless communication network, the method comprising:

configuring corresponding sets of reference signals for different communication service types or classes, the corresponding sets of reference signals to be transmitted by one or both of the first radio network node and a neighboring second radio network node, to support mobility management of wireless devices operating in service areas provided by the first and second radio network nodes;

sending configuration information to the second radio network node, indicating the corresponding sets of reference signals;

transmitting configuration information over an air interface of the first radio network node, indicating the corresponding sets of reference signals;

receiving an indication of mobility measurements performed by a wireless device with respect to a selected set of reference signals, as selected in dependence on a communication service or type in use or to be used by the wireless device; and performing mobility management of the wireless device with respect to the second radio network node, in dependence on the received indication of mobility measurements.

8. The method according to claim 7, further comprising determining the communication service class or type in use or to be used by the wireless device, in dependence on identifying the selected set of reference signals used by the wireless device for performing mobility measurements.

9. The method according to claim 7, further comprising configuring beam groups corresponding to the different communication service types or classes and transmitting individual reference signals in each set of reference signals in respective ones of the beams comprised in each beam group.

10. A wireless device configured for operation in a wireless communication network, the wireless device comprising:

communication circuitry configured for communication in the wireless communication network; and processing circuitry operatively associated with the communication circuitry and configured to:

identify a set of reference signals to use for performing mobility measurements at the wireless device, based on configuration information and a communication service type or class in use or to be used by the wireless device, wherein the configuration information associates different communication service classes or types with corresponding sets of reference signals used at one or more radio network nodes in the wireless communication network for managing mobility of wireless devices operating within service areas corresponding to the one or more radio network nodes;

perform the mobility measurements on one or more reference signals in the identified set of reference signals; and transmit an indication of the mobility measurements to one or more of the one or more radio network nodes.

11. The wireless device according to claim 10, wherein the identified set of reference signals includes at least one reference signal, wherein each included reference signal corresponds to a beam, and wherein the processing circuitry is configured to select, based on the mobility measurements, one of the corresponding beams to use for communicating in the wireless communication network, for the communication service type or class that is in use or to be used by the wireless device.

12. The wireless device according to claim 10, wherein the processing circuitry is configured to:

transmit the indication of the mobility measurements to one or more of the one or more radio network nodes on a triggered basis, responsive to determining that a measured signal strength or quality of the one or more reference signals considered in the mobility measurements fulfills a condition.

13. The wireless device according to claim 10, wherein the processing circuitry is configured to transmit the indication of the mobility measurements by transmitting one of:

a measurement report, a sounding reference signal, or an uplink synchronization signal.

14. The wireless device according to claim 10, wherein each corresponding set of reference signals comprises a set of reference signals associated with a respective beam group, such that different beam groups are associated with the different communication service classes or types, and wherein transmission of the indication of the mobility measurements provides the one or more radio network nodes with an indication of a best beam within the beam group for providing the communication service or type.

15. The wireless device according to claim 10, wherein the processing circuitry is configured to receive the configuration information from one or more of the one or more radio network nodes.

16. A first radio network node configured for operation in a wireless communication network, the first radio network node comprising:
   communication circuitry configured for communication with one or both of a wireless device and a neighboring second radio network node; and
   processing circuitry operatively associated with the communication circuitry and configured to:
      configure corresponding sets of reference signals for different communication service types or classes, the corresponding sets of reference signals to be transmitted by one or both of the first radio network node and the second radio network node, to support mobility management of wireless devices operating in service areas provided by the first and second radio network nodes;
      send configuration information to the second radio network node, indicating the corresponding sets of reference signals;
      transmit configuration information over an air interface of the first radio network node, indicating the corresponding sets of reference signals;
      receive an indication of mobility measurements performed by a wireless device with respect to a selected set of reference signals, as selected in dependence on a communication service or type in use or to be used by the wireless device; and
      perform mobility management of the wireless device with respect to the second radio network node, in dependence on the received indication of mobility measurements.

17. The first radio network node according to claim 16, wherein the processing circuitry is configured to:
   determine the communication service class or type in use or to be used by the wireless device, in dependence on identifying the selected set of reference signals used by the wireless device for performing mobility measurements.

18. The first radio network node according to claim 16, wherein the processing circuitry is configured to configure beam groups corresponding to the different communication service types or classes and transmitting individual reference signals in each set of reference signals in respective ones of the beams comprised in each beam group.

19. A non-transitory computer-readable storage medium, having stored thereon a computer program comprising instructions, which, when executed on at least one processor of a wireless device configured for operation in a wireless communication network, cause the at least one processor to:
   identify a set of reference signals to use for performing mobility measurements at the wireless device, based on configuration information and a communication service type or class in use or to be used by the wireless device, wherein the configuration information associates different communication service classes or types with corresponding sets of reference signals used at one or more radio network nodes in the wireless communication network for managing mobility of wireless devices operating within service areas corresponding to the one or more radio network nodes;
   perform the mobility measurements on one or more reference signals in the identified set of reference signals; and
   transmit an indication of the mobility measurements to one or more of the one or more radio network nodes.

20. A non-transitory computer-readable storage medium, having stored thereon a computer program comprising instructions which, when executed on at least one processor of a first radio network node configured for operation in a wireless communication network, cause the at least one processor to:
   configure corresponding sets of reference signals for different communication service types or classes, the corresponding sets of reference signals to be transmitted by one or both of the first radio network node and a neighboring second radio network node, to support mobility management of wireless devices operating in service areas provided by the first and second radio network nodes;
   send configuration information to the second radio network node, indicating the corresponding sets of reference signals;
   transmit configuration information over an air interface of the first radio network node, indicating the corresponding sets of reference signals;
   receive an indication of mobility measurements performed by a wireless device with respect to a selected set of reference signals, as selected in dependence on a communication service or type in use or to be used by the wireless device; and
   perform mobility management of the wireless device with respect to the second radio network node, in dependence on the received indication of mobility measurements.

\* \* \* \* \*